(12) United States Patent
Chami et al.

(10) Patent No.: US 9,282,499 B2
(45) Date of Patent: Mar. 8, 2016

(54) DATA MANAGEMENT IN TELECOMMUNICATION NETWORKS

(75) Inventors: Youssef Chami, Newbury (GB); Rhys Davies, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 355 days.

(21) Appl. No.: 12/807,813

(22) Filed: Sep. 14, 2010

(65) Prior Publication Data

US 2011/0076985 A1    Mar. 31, 2011

(30) Foreign Application Priority Data

Sep. 16, 2009 (GB) ................................. 0916239.7
Feb. 12, 2010 (GB) ................................. 1002389.3
Jul. 2, 2010 (GB) ................................. 1011161.5

(51) Int. Cl.
*H04L 12/707* (2013.01)
*H04L 12/725* (2013.01)
(Continued)

(52) U.S. Cl.
CPC .............. *H04W 40/02* (2013.01); *H04L 45/22* (2013.01); *H04L 45/302* (2013.01); *H04L 45/304* (2013.01); *H04L 45/306* (2013.01);
(Continued)

(58) Field of Classification Search
CPC ..... H04W 40/02; H04W 40/04; H04W 8/082; H04W 84/045; H04W 84/105; H04W 8/20; H04L 45/22; H04L 45/302; H04L 45/304; H04L 45/306; H04L 45/308
USPC ...................................... 455/426.1, 445, 444
See application file for complete search history.

(56) References Cited

U.S. PATENT DOCUMENTS 6,754,188 B1    6/2004   Garahi et al.
7,640,020 B2 *  12/2009  Gutowski ................... 455/452.2
(Continued)

FOREIGN PATENT DOCUMENTS

WO    WO 03/032661 A1    4/2003
WO    WO 2009/132824 A2  11/2009
(Continued)

OTHER PUBLICATIONS

Stoke: "Stoke Mobile Data Offload Solution Brief", http://www.stoke.com/Solutions/smdo.asp, Aug. 2009, pp. 1-4, XP002617065.
(Continued)

*Primary Examiner* — Nam Huynh
(74) *Attorney, Agent, or Firm* — Knobbe Martens Olson & Bear LLP (57) ABSTRACT

In a telecommunications network including one or more mobile terminals in communicable relation to a mobile network and a data network such that data from the mobile terminals is transmitted towards the data network via the mobile network, a method of directing data from the mobile terminals towards the data network includes: providing an alternative data route towards the data network which bypasses at least a portion of the mobile network; comparing the data from the mobile terminals with selection criteria; and using the result of the comparison to selectively redirecting at least a portion of the data generated by the mobile terminals onto the alternative data route. The alternative data route may be configured to bypass at least a portion of the core component of the mobile network, and data that is redirected is data which is not required to be processed by the bypassed core network component.

29 Claims, 6 Drawing Sheets

(51) Int. Cl.
*H04W 40/02* (2009.01)
*H04W 84/04* (2009.01)
*H04W 8/08* (2009.01)

(52) U.S. Cl.
CPC ............ *H04L45/308* (2013.01); *H04W 8/082* (2013.01); *H04W 84/045* (2013.01)

(56) References Cited

U.S. PATENT DOCUMENTS

| | | |
|---|---|---|
| 2002/0176414 A1 | 11/2002 | Miki et al. |
| 2007/0268855 A1 | 11/2007 | Grayson et al. |
| 2009/0034418 A1 | 2/2009 | Flammer, III et al. |
| 2009/0286540 A1* | 11/2009 | Huber et al. ............... 455/435.1 |
| 2010/0185537 A1* | 7/2010 | Bari ................................. 705/34 |
| 2011/0053596 A1* | 3/2011 | Wohlert et al. ............... 455/436 |
| 2011/0182227 A1* | 7/2011 | Rune ............................. 370/312 |

FOREIGN PATENT DOCUMENTS

| | | |
|---|---|---|
| WO | WO 2010/017233 A1 | 2/2010 |
| WO | WO 2010/039084 A1 | 4/2010 |
| WO | WO 2010/048345 A1 | 4/2010 |

OTHER PUBLICATIONS

Cisco Systems: "Alternative Backhaul and Data Offload Solutions for GSM and UMTS Operators", http://www.cisco.com, 2005, pp. 1-6, XP002617066.

Axerra Networks: "Pseudo-Wire: The Solution for HSDPA Offload", http://www.axerra.com/_Uploads/dbsAttachedFiles/Axerra_HSDPA_Offload_White_Paper.pdf Apr. 30, 2009, pp. 1-8, XP002617067.

Prior Art Publishing GmbH, "Generic Policy Control for Local Breakout", IP.com Journal, IP.com Inc., Nov. 17, 2009, XP013135390, 12 pages.

* cited by examiner

DATA MANAGEMENT IN TELECOMMUNICATION NETWORKS

TECHNICAL FIELD

This application relates to a system and method for use in a telecommunications network and, more particularly, to a system and method for managing data communications in mobile telecommunications networks.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilized, whereby operators charge a flat rate for unlimited amounts of data.

The increased usage is also unfortunately likely to result in an increase of data traffic jams or congestions, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

There is therefore a need to overcome or ameliorate at least one of the problems of the prior art. In particular there is a need to address the needs of both the network operators and the users in improving the provision of mobile broadband data services.

SUMMARY OF THE INVENTION

According to the system described herein, in a telecommunications network including one or more mobile terminals in communicable relation to a mobile network and a data network such that data transmitted between the one or more mobile terminals and the data network is transmitted via the mobile network, a method of directing data between the one or more mobile terminals and the data network includes: providing an alternative data route between the one or more mobile terminals and the data network which bypasses at least a portion of the mobile network; comparing the data to be transmitted with one or more selection criteria; and using the result of the comparison to selectively redirect at least a portion of the data to be transmitted onto the alternative data route.

The traffic may be transmitted by user plane signalling and control plane signalling. The User plane signalling may be selectively redirected over the alternative data route and the control plane signalling may be transmitted via the mobile network. That is, the control plane signalling may always be transmitted via the mobile network. The user plane signalling may therefore not be directed via the alternative data route, i.e. to the public internet.

The one or more selection criteria may relate to a characteristic of the transmitted data, the mobile terminal and/or a user of the mobile terminal transmitting the data.

For instance, the one or more selection criteria may relate to one or more of the following:
i) a priority level of the mobile terminal or a user of the mobile terminal transmitting the data;
ii) a data usage level relating to the mobile terminal or a user of the mobile terminal transmitting the data;
iii) a bandwidth level associated with the mobile terminal or the radio connection of the mobile terminal to the mobile network;
iv) the mobility of the mobile terminal;
v) a charging scheme associated with the mobile terminal or a user of the mobile terminal; or
vi) the type of traffic used by the mobile terminal (e.g. P2P traffic that is not owned by the mobile operator may be selected for offloading); or
vii) a network processing requirement relating to the user, the data and/or the mobile terminal.

More particularly, the network processing requirement may comprise determining whether the data requires processing by one or more components of the bypassed portion of the mobile network. In this regard, the processing required by the one or more components of the bypassed network portion may relate to one or more of the following:
i) a parental control service to be performed on the data transmitted by a particular mobile terminal user;
ii) a lawful interception requirement;
iii) a regulatory content filtering requirement;
iv) traffic optimisation for a given mobile terminal user;
v) cost tracking for charging a given mobile terminal user; and
vi) mobility processing, such as cell handover, for a given mobile terminal user.

The redirecting functionality may occur in the radio access network (RAN) component of a mobile telecommunications network. For instance, for a 3G network, the redirecting functionality may be implemented at or between each Node B or RNC. For a 4G network and for the "flat" 3G (where the RNC is collapsed into the NodeB) it is proposed to perform the redirecting functionality at or between each eNode B and a Point of Concentration before the core network. In other words, the redirecting functionality may occur at any one or more locations in a telecommunications network, although, for data requests emanating from a mobile terminal, it may occur as early in the network as possible.

In arriving at these aspects of the system described herein, it has been appreciated that it is advantageous to offload native IP traffic to an alternative diversionary access network (e.g. a DSL link) as close to the cell site as possible, which may be a third party network or otherwise. The use of this alternative diversionary route for selected data traffic, particularly low priority data, advantageously reserves key network resources, such as backhaul transport resources, core transport resources and cellular core resources, for selected traffic. In particular the selected traffic maintained on the core network route is traffic to which value can be added to, for example through differentiated Quality of Service (QoS), mobility management and optimisation.

Embodiments of the system described herein offload specific type(s) of traffic and/or type(s) of user (e.g. internet) from the transport and the core network elements in the UMTS and LTE network in various deployment scenarios (Femto, Pico, Micro & Macro) toward the internet. That is, an important feature of these aspects of the system described herein is the differentiation of data based on traffic and/or subscriber type.

Further embodiments of the system described herein make intelligent decisions at the network edge on the best path on a per user, service and flow basis, and implement the necessary functionality to terminate mobile network specific protocols before handing off to operator owned fixed access networks or third party networks. In other words, an important feature of these aspects of the system described herein is the differentiation of data based upon subscriber/terminal requirements and/or network requirements.

According further to the system described herein, in a telecommunications network including one or more mobile terminals in communicable relation with a mobile network and a data network, such that data transmitted between the one or more mobile terminals and the data network is transmitted via the mobile network, a data route selection module is provided for directing data between the one or more mobile terminals and the data network. The module is configured to: apply one or more selection criteria to the transmitted data; and use the result of the application of the selection criteria to selectively redirect at least a portion of the data onto an alternative data route between the one or more mobile terminals and the data network, such that the alternative data route bypasses at least a portion of the mobile network. The data may be transmitted by user plane and control plane signalling, and wherein the module is configured to selectively redirect the user plane over the alternative data route, the arrangement being such that the control plane signalling remains transmitted via the mobile network. The data may be transmitted from the one or more mobile terminals towards the data network and the module is configured to redirect the data, as required, on the alternative data route which is provided towards the data network. The mobile network may include a radio access part and a core component and the alternative data route that the module is configured to selectively redirect data onto, bypasses at least a portion of the core component.

According further to the system described herein, a non-transitory computer readable medium stores software for directing data between one or more mobile terminals of a mobile network and a data network. The software includes executable code that provides an alternative data route between the one or more mobile terminals and the data network which bypasses at least a portion of the mobile network. Executable code is provided that applies one or more selection criteria to the data to be transmitted. Executable code is provided that uses the result of the application of the selection criteria to selectively redirect at least a portion of the data to be transmitted onto the alternative data route. The data may be transmitted by user plane signalling and control plane signalling, and wherein the user plane data is selectively redirected over the alternative data route and the control plane signalling is always transmitted via the mobile network. The data may be directed from the one or more mobile terminals towards the data network and the alternative data route is accordingly provided towards the data network.

The one or more selection criteria may relate to at least one of: a characteristic of the transmitted data, the mobile terminal or a user of the mobile terminal transmitting the data. The one or more selection criteria may relate to at least one of the following: a priority level of the mobile terminal or a user of the mobile terminal transmitting the data; a data usage level relating to the mobile terminal or a user of the mobile terminal transmitting the data; a bandwidth level associated with the mobile terminal or the radio connection of the mobile terminal to the mobile network; the mobility of the mobile terminal; a charging scheme associated with the mobile terminal or a user of the mobile terminal; a traffic type being used by the mobile terminal; and a network processing requirement relating to the user, the data and/or the mobile terminal.

The network processing requirement may include determining whether the data requires processing by one or more components of the bypassed portion of the mobile network. The processing required by the one or more components of the bypassed network portion may relate to at least one of the following: a parental control service to be performed on the data transmitted by a particular mobile terminal user; a lawful interception requirement; a regulatory content filtering requirement; a network quality of service requirement; traffic optimisation for a given mobile terminal user; cost tracking for charging a given mobile terminal user; and mobility processing, such as cell handover, for a given mobile terminal user. The mobile network may include a radio access part and a core component and the alternative data route is configured to bypass at least a portion of the core component.

BRIEF DESCRIPTION OF THE DRAWINGS

Embodiments of the system described herein will now be explained in more detail with reference to the accompanying Figures in which.

DETAILED DESCRIPTION OF VARIOUS EMBODIMENTS

Certain elements of a 3G mobile telecommunications network, and its operation, will now briefly be described with reference to FIG. 1.

Each base station (e.g. Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

In a macro 3G network, the Radio Access Network (RAN) is comprised of Node Bs and Radio Network Controllers (RNCs). The Node B is the function within the 3G network that provides the physical and transport radio links between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) in the Packet Switched Core Network. In FIG. 1, Node B 1 is controlled by RNC 3 across the Iub interface. An RNC may control more than one node B.

Figure 1:
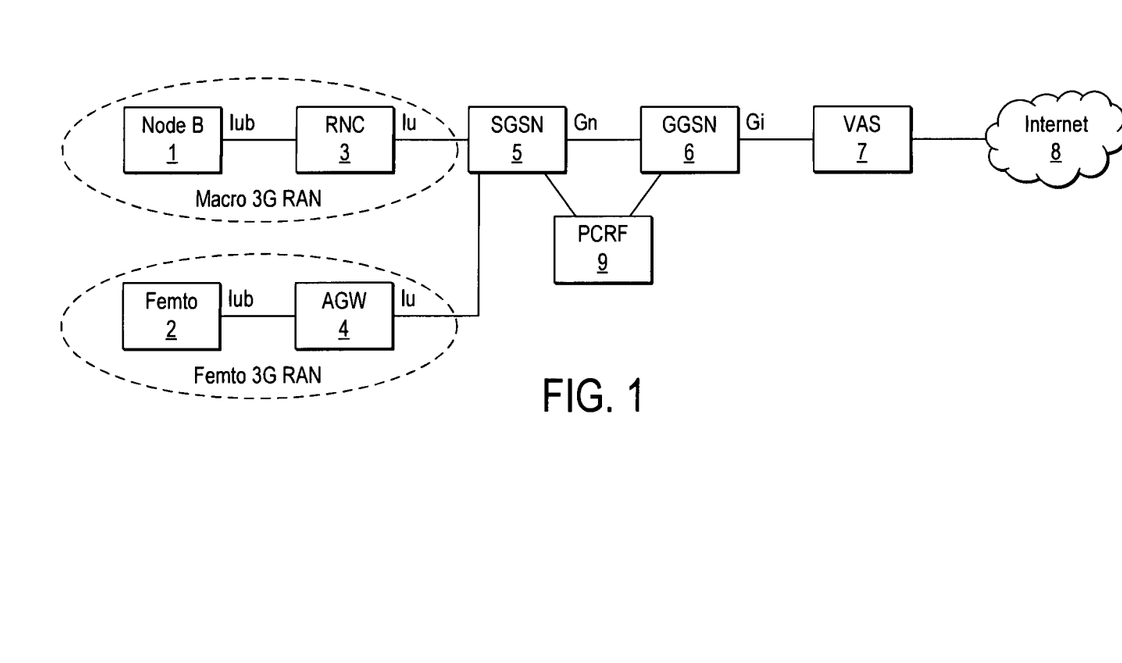
FIG. 1 illustrates a high level packet data network architecture, useful for explaining the prior art and embodiments of the system described herein.

FIG. 1 also illustrates a Femto 3G RAN, with Femto 2 operating as the base station. Femto 2 is connected to an Access Gateway (AGW) (also know as a Concentrator or FemtoGateWay, FGW) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25 m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 may be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

In a 3G network (macro or Femto), the RANs may be controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 may be IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted therebetween by IP transport/DSL transport. The Femto or AGW converts the cellular telecommunications transport protocols used between the mobile terminal and the Femto 2 to the appropriate IP based signalling.

The Femto 2 may be connected to the AGW by other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic maybe inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Traffic in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterized by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the interne.

That is, all data is directed from the applicable RAN through the core network components SGSN, GGSN and VAS before reaching the internet. All 3G PS/HSxPA traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

In an embodiment of the system described herein, in order to successfully offer cheap packet data and be able to compete with the fixed broadband offers (flat fee) a solution is proposed which focuses on the reduction of the end-to-end cost per bit, especially for Internet access service.

This embodiment of the system described herein enables mobile operators to reduce packet data handling costs using an alternative network cost model architecture, which breaks out of the traditional network architecture and nodes and utilizes lower cost transport networks to optimize the data flow.

Figure 2:
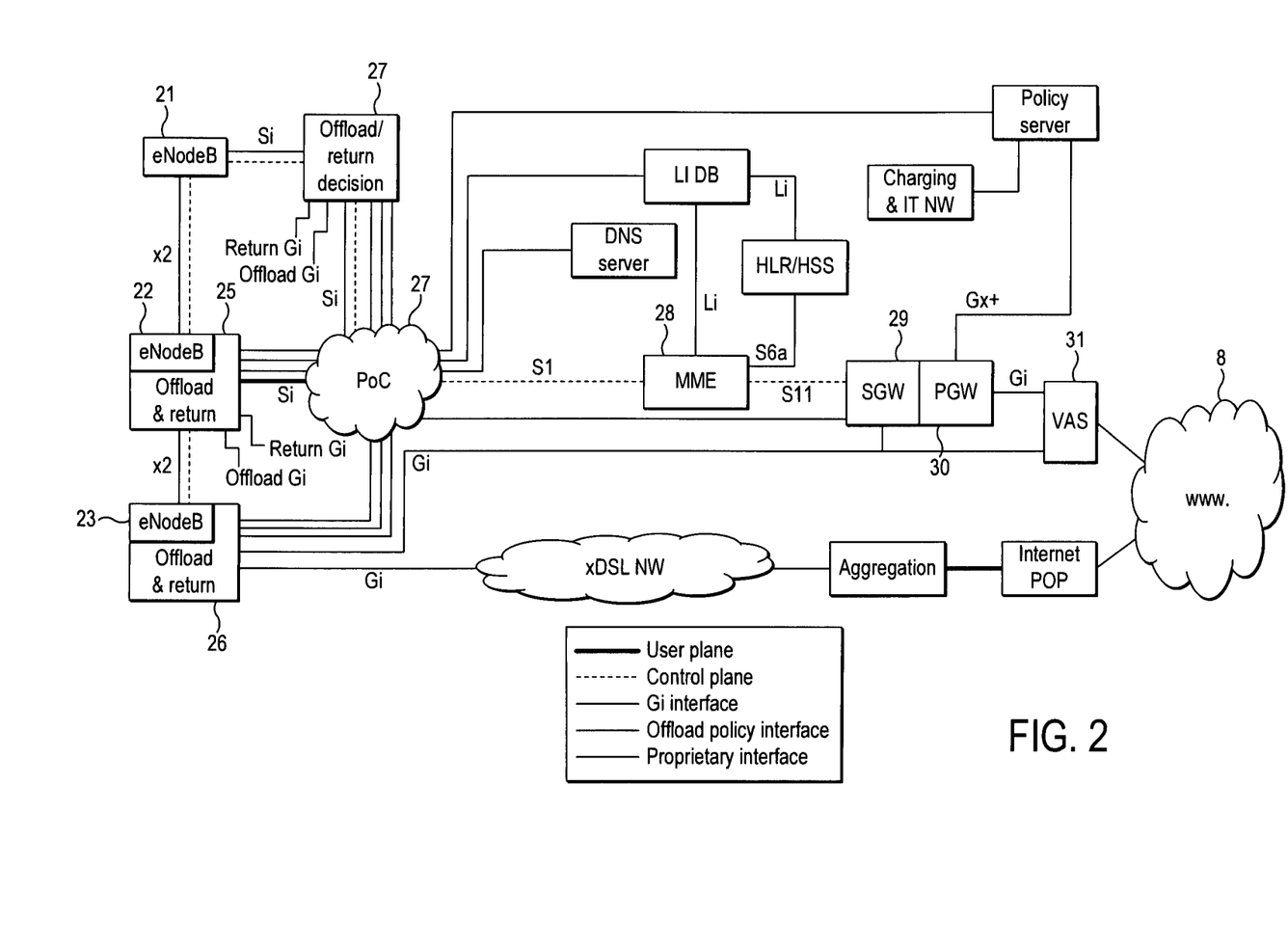
FIG. 2 illustrates an embodiment of the system described herein, implemented in an LTE/SAE network.

In this regard, FIG. 2 shows a high level description of the architecture that may be adopted to deploy this embodiment of the system described herein on the LTE/SAE macro network.

The LTE/SAE network includes eNode Bs (21,22,23) which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

According to this embodiment of the system described herein, offload/return decision functionality (24, 25, 26) is integrated into the network. Ideally this decision functionality is incorporated in the radio architecture. In this regard, the offload/return decision blocks may be incorporated into the eNodeBs (25,26) or exist as separate physical entities (24). It is these offload/return decision blocks that determine the path of communications originating from the mobile terminals.

Each of the eNodeBs (21,22, 23) is connected to the mobile network core through a Point of Concentration (PoC) (27). All traffic from the eNodeBs (21, 22, 23) which is to be routed through the core mobile network is routed to the PoC (27). This includes both user plane and control plane data. On the control plane level, the PoC routes data to and from the Mobility Management Entity (MME) (28) across the S1 interface. Control data is also sent to and from other core network components, including the Lawful Interceptor Database (LI DB), DNS Server, Policy Server (including Charging rules and IT Network) and Home Location Register/Home Subscriber Server (HLR/HSS) (which contains subscriber and device profile and state information).

User plane data, on the other hand, is transmitted by the PoC 27 to the Serving GateWay (SGW) 29 and then to the Packet data network GateWay (PGW) 30. The SGW and PGW are typically separate entities, with the SGW being a data plane element whose primary function is to manage user-plane mobility and data being transferred between the eNodeBs and the PDN Gateway (PGW). From the PGW, data is routed across a VAS 31 node to the Internet. In LTE/SAE this is the standard data path from the mobile terminals to the Internet.

To implement this embodiment of the system described herein, an alternative path on which to offload certain data to the internet is provided, whereby, each eNodeB 22, 23 may be connected to a DSL line which is directly connected to the internet. These xDSL connections may be made directly to the eNodeB or made to the eNodeB via other components, such as the PoC. In FIG. 2, the xDSL Network provides access directly to the public internet from eNodeB 23 and is an alternative route for traffic from the PoC. The alternative path for data may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each eNode B and/or PoC is associated with an Offload/Return block, for each data packet request originating from a mobile terminal, a decision is made as to whether the traffic may bypass the core mobile network entirely or may be passed into the core mobile network. The location at which the traffic is routed towards the internet may be immediately after the Offload/Return decision (e.g. at the PoC), however, it may alternatively be routed out from the core network towards the internet at a different component.

Figure 3:
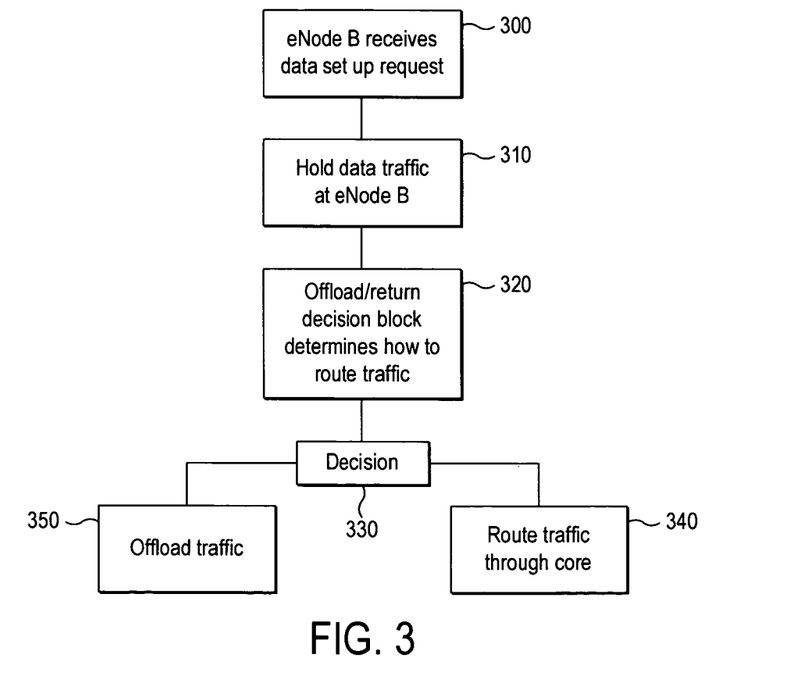
FIG. 3 illustrates a flow chart of the offload decision process as implemented in an LTE/SAE network of FIG. 2 according to an embodiment of the system described herein.

The Offload/Return decision may be dependent upon the type of data or user. To exemplify this feature of the embodiment, FIG. 3 is a flow diagram showing the steps taken when deciding how to route the traffic in the architecture of FIG. 2. For instance, consider an eNodeB receives a request to set up a data call from a user device which is camped on the eNodeB at 300. Once the eNodeB has identified the request as a data call and the type of traffic/user, rather than automatically routing the data traffic to the core network, the data request is held at the eNodeB at 310 until a decision has been made as to how to route the data, in particular whether to offload the traffic directly to the internet or whether to return the data through the core mobile network. Typically, the signalling (control plane) for the connection will continue through the normal route but the user data traffic will be held at the eNodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

In this embodiment of the system described herein, the Mobile Network adds value to traffic by providing a number of services, such as compressing the user data to speed-up the data transfer while downloading. These different services can be broken up into groups and provided by different entities (e.g. this enables greater flexibility in the provision of the services, such as the mandated Internet Watch Foundation—IWF—requirement, which can only be supported by the mobile operator). The Offload/Return decision block therefore makes a decision on whether to offload the traffic or whether to route the traffic through the core network, based on the applicability of one or more of the services to the traffic. That is, the Offload/Return system decides when data traffic requires one or more of the services and when it can do without them.

It should also be noted that these services are ones that could be provided without using the core network. These are services that add value to the customer, and which subscribers will pay for (explicitly or implicitly).

Referring again to FIG. 3, the offload/return decision block determines how to route the traffic at 320 and, at 330, the decision as to how to route the traffic is made. This decision may be made by interrogating certain servers or databases stored within the core network which can compare the type of service, type of user etc with criteria which identifies whether the traffic is suitable for offloading directly to the internet (at 350) from the eNodeB or whether the traffic should be routed through the core (at 340). Examples of some of the considerations used in influencing the decision of whether to offload the traffic are discussed below in more detail. The implementation of this data offload technique may be carefully considered, as it places additional constraints on the network design.

The following is a non-exhaustive list of examples of challenges that have to be considered when implementing the data offload technique:

a) maintaining Customer Services provided by the core network or otherwise;

b) maintaining Network Services (e.g. Charging Rate Limiting/application control); and     c) maintaining Regulatory Services (e.g. to enable Lawful Interception and Regulatory Content Filtering).

Some specific examples of Customer Services that can be taken into account by the offload decision module include:

i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.

ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded     iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:

i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.

ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.

iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF may be modified, and alternatively, static or semi-static rules, pre-stored with the offload module, can be considered.

iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:

i) The offload decision module can have the capability to characterize the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.

ii) The offload decision module is situated on the IuPS for the 3G network (i.e. between the RNC and the SGSN) or S1 for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception will be maintained in any offload or local breakout plans. The options for offload are:

Maintain the evaluation of LI in the core network, and not offload users whose traffic needs to be intercepted (e.g. where the user has been tagged by the police for communication interception). Since the LI functionality is handled by the core network, the core network accordingly cannot be bypassed;

Add LI capability to the offload decision module, which will require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g. for Internet Watch Foundation (IWF)): This required functionality blocks illegal websites. This functionality could easily be added to the offload decision module as it is not processor intensive. An http proxy server, for instance, could be used to support this functionality. Otherwise, the traffic will be returned back to a dedicated core node(s).

A further criterion that the offload decision module may consider is the priority of the customer. In this regard, a network operator may wish to prioritize traffic across its network based on the priority level of the customer. For example, a high value customer (e.g. a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 was in relation to the proposed LTE/SAE network. Embodiments of the system described herein are equally applicable to 3G networks. In this regard, FIGS. 4 and 5 show examples of possible network architectures for implementing the offload decision module in 3G macro networks and 3G Femto networks respectively.

Figure 4:
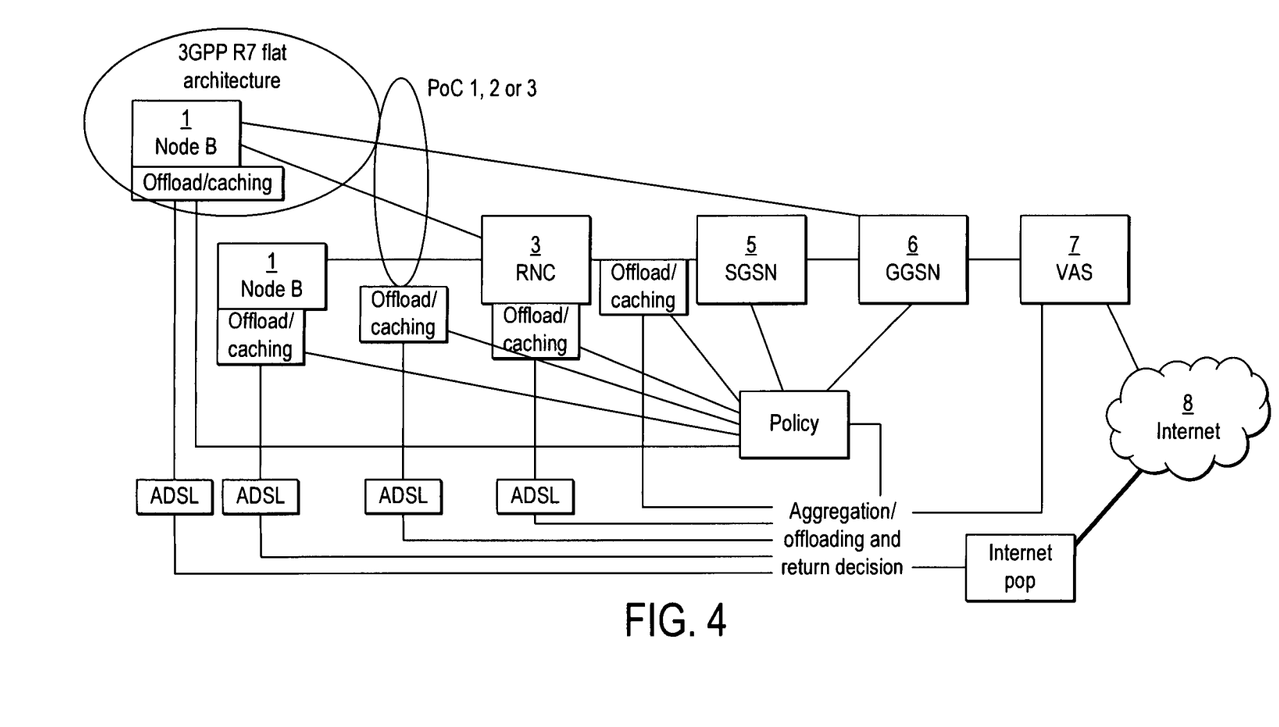
FIG. 4 illustrates an embodiment of the present system described herein, implemented in a 3G UNITS network.
Figure 5:
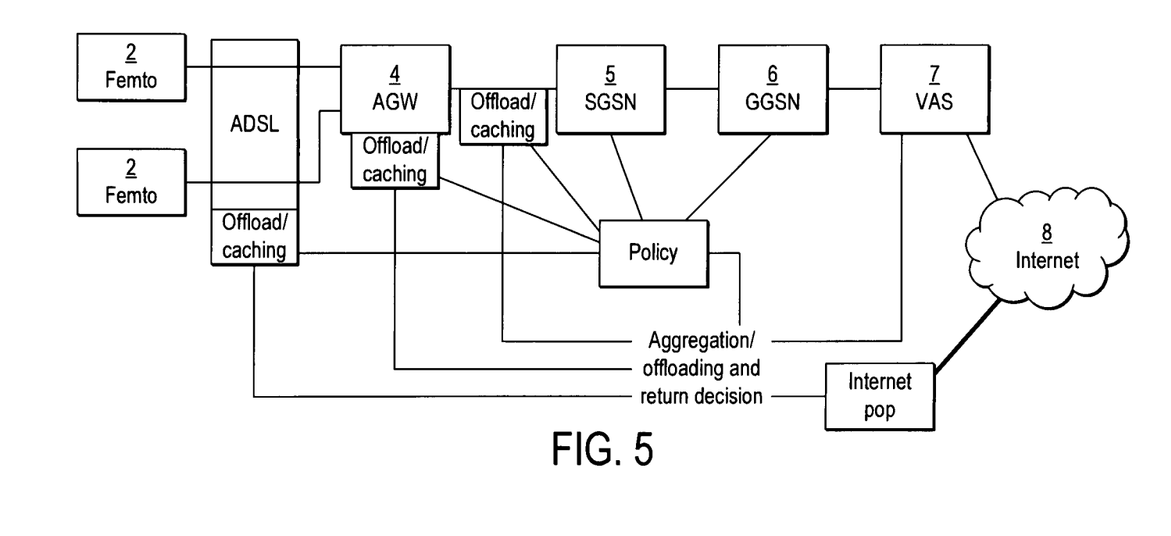
FIG. 5 illustrates an embodiment of the system described herein, implemented in a 3G network utilising femto cells.

The offload decision modules would operate in the same manner as described in relation to the LTE/SAE network, however, as shown in FIGS. 4 and 5 the offload/return decision block may be located at many different locations in the network.

In this regard, from FIG. 4 in particular it can be seen that the exact placement of the decision module/gateway may be modified according to the system described herein, and that, for a macro 3G network, it can be placed at or between the Node Bs and the RNCs, and also between the RNCs and the SGSNs (or any combination thereof). It would also be possible to place the module/gateway at the GGSN (although not the SGSN as this does not control user data, only control data).

In the Legacy 3G Macro network (FIG. 4), the aim is to offload a high percentage of the macro network traffic from the core and transport (IuPS, Gn, etc) by diverting specific traffic type for certain user(s) class directly to the Internet.

The decisions taken to determine whether to return the traffic through the core or whether to offload the traffic directly to the internet are typically made on the same basis as those discussed above in relation to the LTE/SAE. Again the offload/return decision block manages the decision on how to route the data.

Where the decision block is located in the Node Bs (or on the Iub interface), it becomes possible to redirect the data from all the remaining mobile network elements (e.g. the RNC, SGSN, GGSN and VAS for macro 3G), and sending the data directly to the Internet 8. In a similar manner, where the decision block is located at the RNC (or on the Iu interface), it becomes possible to redirect the data from the SGSN 5, GGSN 6 and the VAS 7. The alternative data route may be a DSL using ADSL.

Further, the alternative data routes may be aggregated for each cell, where applicable. In this regard, each cell will have at least one RNC 3 and a plurality of Node Bs, so where the decision blocks are situated at or in the vicinity of the Node Bs, for instance, there will be a plurality of links which should ideally be aggregated before being passed to the Internet 8. At the point of this aggregation, there may be a further decision block which enables data to be returned to the legacy route. For instance, a new policy rule may have been implemented, which requires or enables previously offloaded data to be returned to the core network route. This new policy rule may be communicated to the return decision module by the core network policy module. In FIGS. 4 and 5, this returning of data is only shown to the VAS 7, but the data may be returned to one or more of the other core network elements.

Figure 6:
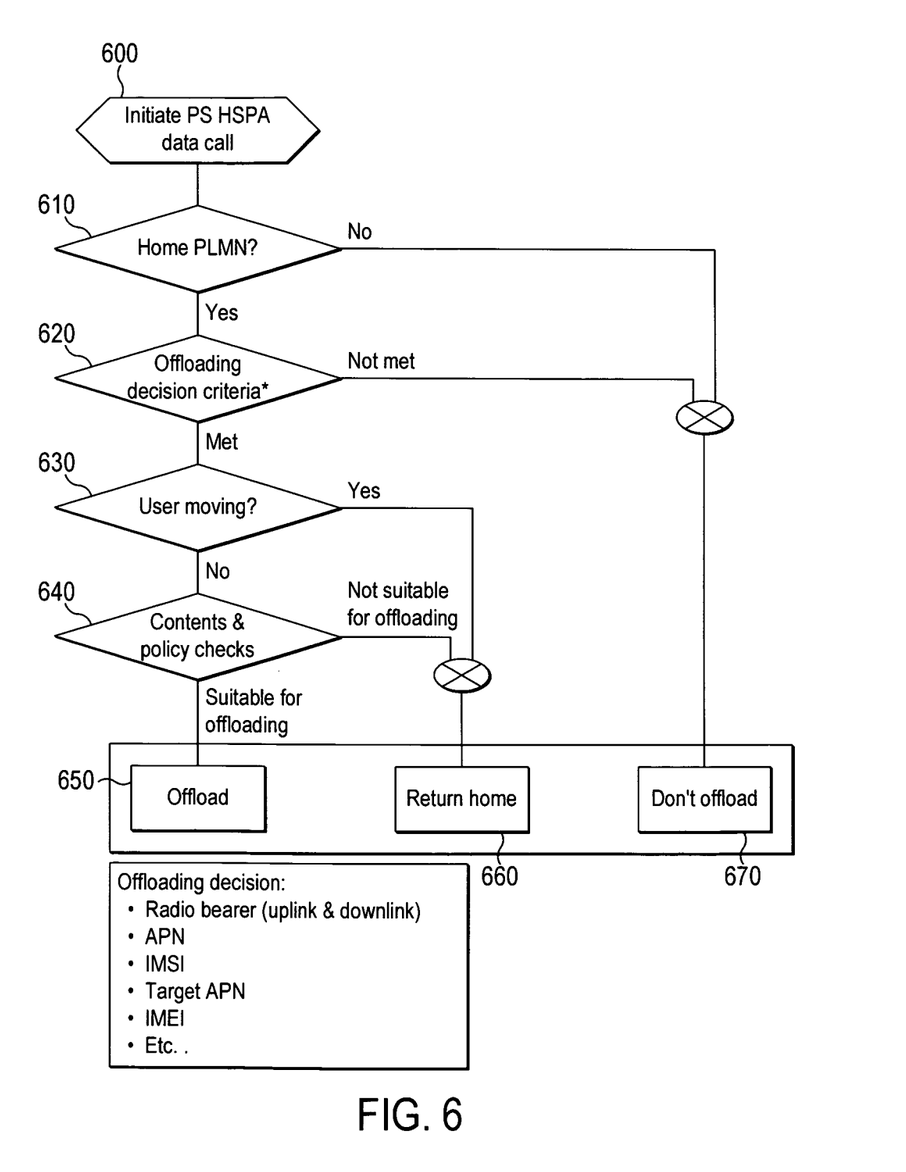
FIG. 6 illustrates a flow chart of an offload decision making process that may be implemented by a redirection module according to an embodiment of the system described herein.

A more specific example of how the offload decision module may be implemented is described in relation to FIG. 6. FIG. 6 is a flow diagram illustrating a method for deciding whether to offload data traffic to the internet according to an embodiment of the system described herein. The decision structure is composed in a hierarchical form in order that certain types of user or data are always directed through the core network. The example of FIG. 6 is described for a 3G network but it will be clear to those skilled in the art that these decisions could be applied to any type of radio access technology.

Once a PS HSPA data call (or other connection) is made and received at the Node B at 600, a primary consideration by the offload/return block at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The offload/return block at 610 will also consider other factors, such as what application types running on the mobile terminal require connections. If the mobile device is operating on its home network at 610, or if the applications do not require a connection to the core network, the offload/return block considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the internet at 650. If it is determined that the user is not suitable for offloading to the internet at 640 then the procedure returns "home" at 660. A connection is provided by a network core and the tests of the flowchart shown in FIG. 6 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures will be appropriate for different networks, different conditions etc and that the example of FIG. 6 is just one way the decision could be made.

The embodiments of the system described herein are to be taken as illustrative of the system described herein, and not limiting. For instance, whilst the embodiments have chiefly been described in relation to transmitting data traffic from a mobile terminal to a data network, the principles of the system described herein may also be applied to transmissions from a data network towards a mobile terminal.

In the embodiments described above the decision regarding the route is said to me made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision will be made to offload the data over the alternative data route. Subsequently it maybe detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it will be detected that parental control is required. In response for the requirement for parental control, a decision may be made to redirect subsequent data during the Communication session via the core network so that core network parental controls can be applied.

It is to be appreciated that the present embodiments of the system described herein may be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC however, it is returned to the cellular and transport core networks and there is no differentiation made based upon data traffic type.

Other aspects of the system described herein are set out in the following paragraphs:

(A) A method for routing data traffic from a mobile communication device to a internetwork comprising the steps of: receiving a request to initiate a connection to carry data traffic between a mobile communication device and an internetwork at a mobile network entity; identifying at least one parameter associated with the request; comparing the at least one parameter with at least one predefined condition; and selecting a predefined network route for the data traffic in dependence on the comparison.

(B) A method for routing data traffic according to paragraph (A) wherein a network route comprises a connection through the core mobile network.

(C) A method for routing data traffic according to paragraph (A) or (B) wherein a network route comprises a DSL connection to the network entity which bypasses the core mobile network.

(D) An apparatus for routing data traffic from a mobile communication device to an internetwork comprising: a receiver that receives a request to initiate a connection to carry data traffic between a mobile communication device and an internetwork at a mobile network entity; an identification device that identifies at least one parameter associated with the request; a comparison device that compares the at least one parameter with at least one predefined condition; and a selection device that selects a predefined network route for the data traffic in dependence on the comparison.

(E). An apparatus for routing data traffic according to paragraph (D) wherein a network route comprises a connection through the core mobile network.

(F) An apparatus for routing data traffic according to paragraph (E) or (F) wherein a network route comprises a DSL connection to the network entity which bypasses the core mobile network.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. In a communication network including one or more mobile terminals configured to communicate over a mobile network with a data network such that data transmitted between the one or more mobile terminals and the data network is transmitted via the mobile network, a method of directing data between the one or more mobile terminals and the data network comprising:
   providing a data route between the one or more mobile terminals and the data network through core components of the mobile network;
   providing an alternative data route between the one or more mobile terminals and the data network, wherein the alternative data route bypasses at least a portion of the core components of the mobile network;
   receiving a request to communicate the data with the data network from the one or more mobile terminals;
   executing a decision method to determine whether the data is to be routed through the alternative data route or the data route by applying one or more selection criteria to the data to be transmitted;
   when the one or more mobile terminals are moving across one or more areas of the mobile network, routing the data on the data route independent of an outcome of the decision method; and
   when the one or more mobile terminals are not moving across one or more areas of the mobile network, selectively redirecting at least a portion of the data to be transmitted on the alternative data route based on the outcome of the decision method.

2. The method of claim 1, wherein the data is transmitted by user plane signalling and control plane signalling, and wherein the user plane is selectively redirected over the alternative data route and the control plane signalling is always transmitted via the mobile network.

3. The method of claim 1, wherein the data is directed from the one or more mobile terminals towards the data network and the alternative data route is accordingly provided towards the data network.

4. The method of claim 1, wherein the plurality of selection criteria relate to at least one of: a characteristic of the transmitted data, the mobile terminal or a user of the mobile terminal transmitting the data.

5. The method of claim 1, wherein the plurality of selection criteria relate to at least one of the following:
   a priority level of the mobile terminal or a user of the mobile terminal transmitting the data;
   a data usage level relating to the mobile terminal or a user of the mobile terminal transmitting the data;
   a bandwidth level associated with the mobile terminal or a radio connection of the mobile terminal to the mobile network;
   a mobility of the mobile terminal;
   a charging scheme associated with the mobile terminal or the user of the mobile terminal;
   a traffic type being used by the mobile terminal; and
   a network processing requirement relating to the user, the data and/or the mobile terminal.

6. The method of claim 5, wherein the plurality of selection criteria relate to the network processing requirement, and wherein the network processing requirement comprises determining whether the data requires processing by one or more components of the bypassed portion of the mobile network.

7. The method of claim 6, wherein the processing required by the one or more components of the bypassed network portion relates to at least one of the following:
   a parental control service to be performed on the data transmitted by a particular mobile terminal user;
   a lawful interception requirement;
   a regulatory content filtering requirement;
   a network quality of service requirement;
   traffic optimisation for a given mobile terminal user;
   cost tracking for charging a given mobile terminal user; and
   mobility processing for a given mobile terminal user.

8. The method of claim 1, wherein applying the decision method includes traversing the plurality of selection criteria that are separated into least primary and secondary selection criteria, and wherein the portion of the data is selectively redirected to the alternative data route when the primary and the secondary criteria are satisfied.

9. The method of claim 8, wherein the alternative data route includes a route via a public internet.

10. The method of claim 1, wherein the first selection criteria is whether the mobile terminal is in a home network thereof.

11. The method of claim 1, further comprising determining whether the one or more mobile terminals associated with the data are operating in a home network or are roaming and determining whether one or more offloading criteria associated with the data are met.

12. In a communications network including one or more mobile terminals configured to communicate over a mobile network with a data network, such that data transmitted between the one or more mobile terminals and the data network is transmitted via the mobile network, a data route selection module for directing data between the one or more mobile terminals and the data network, the module configured to:
   provide a data route between the one or more mobile terminals and the data network through core components of the mobile network;
   provide an alternative data route between the one or more mobile terminals and the data network wherein the alternative data route bypasses at least a portion of the core components of the mobile network;
   receive a request to communicate the data with the data network from the one or more mobile terminals;
   execute a decision method to determine whether the data is to be routed through the alternative data route or the data route by applying one or more selection criteria to the transmitted data;

when the one or more mobile terminals are moving across one or more areas of the mobile network, route the data on the data route independent of an outcome of the decision method; and when the one or more mobile terminals are not moving across one or more areas of the mobile network, selectively redirect at least a portion of the data to the alternative data route based on the outcome of the decision method.

13. The module of claim 12, wherein the data is transmitted by user plane and control plane signalling, and wherein the module is configured to selectively redirect the user plane over the alternative data route, such that the control plane signalling remains transmitted via the mobile network.

14. The module of claim 12, wherein the data is transmitted from the one or more mobile terminals towards the data network and the module is configured to redirect the data, as required, on the alternative data route which is provided towards the data network.

15. The module of claim 12, wherein the module is configured for use in a 3G or a 4G network.

16. The module of claim 12, wherein the module is associated with at least one of: an RNC, a PoC, a Node B, an eNode B or an SGSN of the communications network.

17. The module of claim 12, wherein applying the decision method includes traversing the plurality of selection criteria that are separated into least primary and secondary selection criteria, and wherein the portion of the data is selectively redirected to the alternative data route when the primary and the secondary criteria are satisfied.

18. The module of claim 17, wherein the alternative data route includes a route via a public internet.

19. The module of claim 12, wherein the first selection criteria is whether the one or more mobile terminals are in a home network thereof.

20. A non-transitory computer readable medium storing software for directing data between one or more mobile terminals of a mobile network, which includes a radio access part and a core component, and a data network, the software comprising:

executable code that receives a request to communicate the data with the data network from the one or more mobile terminals;

executable code that executes a decision method to determine whether the data is to be routed through a data route between the one or more mobile terminals and the data network or an alternative data route that bypasses at least a portion of core components of the mobile network by applying one or more selection criteria to the data to be transmitted;

executable code that, when the one or more mobile terminals are moving across one or more areas of the mobile network, routes data on the data route independent of an outcome of the decision method, the data route providing a route through the core components of the mobile network; and executable code that, when the one or more mobile terminals are not moving across the one or more areas of the mobile network, selectively redirects at least a portion of the data on the alternative data route based on the outcome of the decision method.

21. The non-transitory computer readable medium of claim 20, wherein the data is transmitted by user plane signalling and control plane signalling, and wherein the user plane data is selectively redirected over the alternative data route and the control plane signaling is always transmitted via the mobile network.

22. The non-transitory computer readable medium of claim 20, wherein the data is directed from the one or more mobile terminals towards the data network and the alternative data route is accordingly provided towards the data network.

23. The non-transitory computer readable medium of claim 20, wherein the plurality of selection criteria relates to at least one of: a characteristic of the transmitted data, the mobile terminal or a user of the mobile terminal transmitting the data.

24. The non-transitory computer readable medium of claim 20, wherein the plurality of selection criteria relate to at least one of the following:

a priority level of the mobile terminal or a user of the mobile terminal transmitting the data;

a data usage level relating to the mobile terminal or a user of the mobile terminal transmitting the data;

a bandwidth level associated with the mobile terminal or a radio connection of the mobile terminal to the mobile network;

a mobility of the mobile terminal;

a charging scheme associated with the mobile terminal or the user of the mobile terminal;

a traffic type being used by the mobile terminal; and a network processing requirement relating to the user, the data and/or the mobile terminal.

25. The non-transitory computer readable medium of claim 20, wherein the plurality of selection criteria relate to the network processing requirement, and wherein the network processing requirement comprises determining whether the data requires processing by one or more components of the bypassed portion of the mobile network.

26. The non-transitory computer readable medium of claim 25, wherein the processing required by the one or more components of the bypassed network portion relates to at least one of the following:

a parental control service to be performed on the data transmitted by a particular mobile terminal user;

a lawful interception requirement;

a regulatory content filtering requirement;

a network quality of service requirement;

traffic optimisation for a given mobile terminal user;

cost tracking for charging a given mobile terminal user; and mobility processing for a given mobile terminal user.

27. The non-transitory computer readable medium of claim 20, wherein the executable code that applies the decision method includes executable code that traverses the plurality of selection criteria that are separated into least primary and secondary selection criteria, and wherein the portion of the data is selectively redirected to the alternative data route when the primary and the secondary criteria are satisfied.

28. The non-transitory computer readable medium of claim 27, wherein the alternative data route includes a route via a public internet.

29. The non-transitory computer readable medium of claim 20, wherein the first selection criteria is whether the one or more mobile terminals are in a home network thereof.

* * * * *